(12) United States Patent
Yoshida

(10) Patent No.: US 10,400,820 B2
(45) Date of Patent: Sep. 3, 2019

(54) LINEAR MOTION GUIDE UNIT

(71) Applicant: NIPPON THOMPSON CO., LTD., Tokyo (JP)

(72) Inventor: Masaharu Yoshida, Tokyo (JP)

(73) Assignee: NIPPON THOMPSON CO., LTD., Tokyo (JP)

(*) Notice: Subject to any disclaimer, the term of this patent is extended or adjusted under 35 U.S.C. 154(b) by 21 days.

(21) Appl. No.: 15/730,887

(22) Filed: Oct. 12, 2017

(65) Prior Publication Data

US 2018/0112708 A1    Apr. 26, 2018

(51) Int. Cl.
*F16C 29/06* (2006.01)
*F16C 29/00* (2006.01)

(52) U.S. Cl.
CPC ........ *F16C 29/0609* (2013.01); *F16C 29/005* (2013.01); *F16C 29/065* (2013.01)

(58) Field of Classification Search
CPC .................................................. F16C 29/0609
See application file for complete search history.

(56) References Cited

U.S. PATENT DOCUMENTS

| | | | | |
|---|---|---|---|---|
| 6,682,218 B2* | 1/2004 | Ishihara | ................ | F16C 29/063 384/45 |
| 7,108,426 B2* | 9/2006 | Itabashi | .............. | F16C 29/0609 384/45 |
| 7,585,112 B2* | 9/2009 | Hsu | ....................... | F16C 29/0609 384/45 |
| 7,980,763 B2* | 7/2011 | Michioka | ............ | F16C 29/0642 384/43 |
| 8,167,492 B2* | 5/2012 | Natale | ................. | F16C 29/0609 384/13 |
| 9,528,549 B2* | 12/2016 | Kikuchi | ................ | F16C 29/064 |

FOREIGN PATENT DOCUMENTS

| | | |
|---|---|---|
| JP | 2002155936 A | 5/2002 |
| JP | 2003269450 A | 9/2003 |
| JP | 2005273765 A | 10/2005 |
| JP | 2008133837 A | 6/2008 |

* cited by examiner

*Primary Examiner* — Thomas R Hannon
(74) *Attorney, Agent, or Firm* — Browdy and Neimark, P.L.L.C.

(57) ABSTRACT

In a linear motion guide unit, in order to prevent direct collision of a roller, or a rolling element, with an end portion of a carriage, an extending portion of a spacer of an end cap is disposed at the end portion of the carriage for absorbing impact resulting from collision of the roller. The spacer has the extending portion which protrudes from the spacer at a position adjacent to an inner circumferential surface of a turnaround passage and which has a wall surface continuous from the inner circumferential surface of the turnaround passage. The wall surface of the extending portion serves as a collision receiving surface for receiving a colliding roller. The carriage has a housing recess which is formed at an end of a raceway groove thereof and to which the extending portion is fitted.

7 Claims, 7 Drawing Sheets

LINEAR MOTION GUIDE UNIT

FIELD OF THE INVENTION

The present invention relates to a linear motion guide unit composed of a guide rail having raceway grooves, and a slider moving on the guide rail via rolling elements.

BACKGROUND OF THE INVENTION

Conventionally, in a linear motion guide unit, in order for rolling elements to smoothly enter or exit from a load-carrying race formed by a raceway groove of a carriage of a slider, gently sloped crowning portions are formed at opposite ends of the raceway groove of the carriage, which opposite ends are inlet portions of the load-carrying race. In a conventional linear motion guide unit, for example, a load-carrying race is composed of inlet portions and a substantially load-carrying portion extending between the inlet portions. The conventional linear motion guide unit has the carriage in which raceway grooves are formed so as to serve as load-carrying races, and end caps which are disposed at opposite ends of the carriage and in which respective turnaround passages are formed. The crowning portions are gently sloping surfaces formed respectively at opposite ends of the raceway groove of the carriage. At a connection end of the carriage between the load-carrying race and the turnaround passage, an end surface of the carriage where the crowning portion merges into the inner circumference of the turnaround passage is chamfered; in other words, an end of the crowning portion is chamfered.

Japanese Patent Application Laid-Open (kokai) No. 2002-155936 discloses a guide unit in which in order to achieve a high-speed movement of a slider, there is eliminated the presence of any jagged structure against rolling elements which roll from a no-load area to a load area, whereby sliding resistance and noise are reduced in high-speed relative movement between the slider and a guide rail. In the guide unit, a load-carrying race has crowning areas at respective opposite ends of the load area of the slider; specifically, as the load-carrying race approaches a turnaround passage, the race gradually expands such that an edge portion of the load-carrying surface is recessed in relation to the inner side wall surface of the turnaround passage to thereby form a step portion. As a result, even in the presence of an error in forming a guide portion and an error in forming the load-carrying race, the load carrying race does not protrude toward the guide rail from the side wall surface of the turnaround passage. The size of the step portion is about 5% of the roller diameter.

Japanese Patent Application Laid-Open (kokai) No. 2003-269450 discloses a linear motion unit configured to enable smooth circulation of rollers by eliminating the influence of a certain manufacturing error at connections between roller passages which constitute a roller circulation passage. In the linear motion unit, a sloped portion is formed at a connection between a roller rolling passage composed of a guide groove of a guide rail and a guide groove of a slider body, and a roller-return-passage curved portion defined by a return guide and an end cap attached to the slider body. The sloped portion expands in diameter from the roller rolling passage toward the roller-return-passage curved portion. In the linear motion unit, an end portion of the slider body has an inclined inner circumferential surface; an end portion of an engagement protrusion of the return guide has an inclined outer circumferential surface; the inclined outer circumferential surface of the return guide is fitted into the inclined inner circumferential surface of the end portion of the slider body; and as a result of the end portion of the engagement protrusion of the return guide having the inclined outer circumferential surface, the end portion of the engagement protrusion is thin-walled.

Japanese Patent Application Laid-Open (kokai) No. 2008-133837 discloses a linear motion guide unit which exhibits improved durability in high-speed running and restrains deterioration in load capacity and rigidity through prevention of worsening of vibration resulting from passage of rolling elements. In the linear motion guide unit, each of sloped portions provided at respective opposite ends of a slider-side rolling-element raceway groove is composed of a first crowning portion in the form of a curved surface having such a large radius of curvature as to be gently sloped continuously from the slider-side rolling-element raceway groove, a planar second crowning portion adjacent to the first crowning portion, extending toward the inner circumferential surface of a turnaround passage, and shorter than the first crowning portion, and a sloped surface provided between the second crowning portion and an end surface of a slider body and sloped more steeply than the first and second crowning portions.

Japanese Patent Application Laid-Open (kokai) No. 2005-273765 of a patent application filed by the applicant of the present invention discloses a linear motion guide unit having standard specifications for allowing use in wide applications, allowing easy formation of crowning portions, having a relatively small crowning depth, and exhibiting high precision and durability. In the linear motion guide unit, at gateways to a raceway groove of a carriage, which gateways partially constitute a load-carrying race, there are formed respective crowning portions having the form of gently curved surfaces for allowing rolling elements to smoothly enter and exit from the load-carrying race, and radiused portions in the form of curved surfaces formed at respective opposite ends of the raceway groove. The crowning portions and the corresponding radiused portions are connected continuously and smoothly.

Meanwhile, in recent years, demand has been rising for a high-speed linear motion guide unit. Due to high-speed rolling of rolling elements, the high-speed linear motion guide unit involves, for example, the following problem: at a connection between a carriage and each end cap, rolling elements hit against an inner surface of a load-carrying race at an end portion of the carriage; as a result, exfoliation or flaking occurs at the end portion of the carriage. Specifically, in a linear motion guide unit of a retainer-less type, in the course of movement of rollers, or rolling elements, from a turnaround passage to a load-carrying race, when a roller passes the tip of a scooping beak of an end cap body and an end of a raceway groove of a guide rail; i.e., an end of a raceway surface of the guide rail, the roller collides with the guide rail and bounds, and the bounding roller collides with an opposite corner portion of an end of the carriage, potentially resulting in exfoliation; i.e., flaking, of the corner portion.

In view of the foregoing, the inventors of the present invention studied feasibility of the following means to avoid exfoliation of or damage to a corner portion of the carriage in the linear motion guide unit: an extending portion which protrudes toward the carriage side from a spacer of an end cap at a position adjacent to the inner circumferential surface of the spacer, which partially constitutes a turnaround passage, is formed in such a manner as to be flush with a raceway groove of the carriage, whereby the bounding roller or rolling element collides with the extending portion, and thus the extending portion absorbs impact force of the colliding roller to thereby avoid exfoliation of or damage to the corner portion of the carriage.

SUMMARY OF THE INVENTION

The present invention has been conceived to solve the above problem, and an object of the present invention is to provide a linear motion guide unit in which in order to prevent direct collision of a roller, or a rolling element, with a corner of an end portion of a carriage, an extending portion of a spacer is disposed at the end portion of the carriage so as to receive a bounding, rolling roller by the extending portion for absorbing impact of collision of the roller; i.e., the extending portion protruding toward the carriage side from the spacer at a position adjacent to the inner circumferential surface, which partially constitutes the turnaround passage, receives a colliding roller, or a colliding rolling element, and absorbs impact force of the colliding roller, thereby avoiding exfoliation of or damage to a corner portion of the carriage.

Means to Solve the Problems

The present invention provides a linear motion guide unit comprising a guide rail having a first raceway groove extending along a longitudinal direction, and a slider which has a second raceway groove facing the first raceway groove of the guide rail and slides in relation to the guide rail via a plurality of rolling elements. The slider has a carriage and end caps disposed on opposite end surfaces of the carriage. The carriage has the second raceway groove and a return passage extending along the second raceway groove formed therein. The end caps have respective turnaround passages formed therein. The turnaround passages establish communication between the return passage and a load-carrying race composed of the first raceway groove and the second raceway groove, to thereby form a circulation passage for the rolling elements. Each end cap has an extending portion which protrudes from the end cap at a position adjacent to an inner circumferential surface of the turnaround passage and which has a wall surface extending continuously from the inner circumferential surface of the turnaround passage and serving as a collision receiving surface for receiving collision of the rolling elements. The carriage has, at each of opposite ends of the second raceway groove, a housing recess which is formed by a stepwise space and to which the extending portion is fitted. The wall surface of the extending portion and an end raceway surface of the second raceway groove form a continuous surface.

The end cap comprises an end cap body and a spacer. The end cap body has a scooping beak located on the first raceway groove of the guide rail and has an outer circumferential surface of the turnaround passage formed thereon. The spacer is fitted in a recess formed in a carriage-side end surface of the end cap body, has the inner circumferential surface of the turnaround passage formed thereon, and has the extending portion.

A crowning portion in the form of a curved surface gently curved toward the turnaround passage is formed on the end raceway surface of the second raceway groove of the carriage for allowing the rolling elements to smoothly enter and exit from the load-carrying race. The stepwise space formed at the end of the second raceway groove is located at a position corresponding to the crowning portion.

A positioning hole is formed in each of the opposite ends of the carriage for positioning the spacer in relation to the carriage. The spacer has a positioning projection to be fitted into the positioning hole.

The second raceway groove of the carriage and the extending portion of the spacer disposed on the second raceway groove undergo simultaneous grinding such that a surface of the second raceway groove and the wall surface of the extending portion are formed into the continuous surface.

The wall surface of the extending portion is semicircularly curved from the end raceway surface of the second raceway groove to the inner circumferential surface of the turnaround passage. The stepwise space of the carriage is radiused at a corner of its bottom in contact with an end surface of the extending portion.

The rolling element is a roller. The length of the extending portion is equal to the length of a connection pipe which protrudes from a back of the end cap and which is to be fitted into an end of the return passage of the carriage.

Effect of the Invention

The present linear motion guide unit is configured as described above, and the extending portion disposed in an area where rollers would otherwise collide with the carriage is formed integrally with the spacer. Therefore, the present linear motion guide unit can be easily machined and assembled. When a roller enters the load-carrying race from the turnaround passage, the roller collides with the extending portion disposed in the carriage; as a result, the extending portion absorbs impact of the colliding roller; thus, the colliding roller does not damage the carriage. Usually, since collision energy of a roller is proportional to the square of velocity, an edge portion of the load-carrying surface of the carriage is apt to be damaged.

However, according to the linear motion guide unit of the present invention, since the extending portion of the spacer is located in an area where rollers would otherwise collide with the carriage, the rollers collide with the extending portion, and the extending portion absorbs impact of the colliding rollers, whereby a corner portion of the carriage can be free from damage. Since the spacer having the extending portion is formed of a resin material having wear resistance, such as PEEK (polyetheretherketone) or POM (polyacetal resin), and being inexpensive as compared with the material of the carriage, the spacer having the extending portion can be manufactured easily at low cost; further, in the event of damage to the extending portion, only the spacer can be easily replaced with a new one with a resultant reduction in cost. The extending portion can have a semicircularly curved section taken perpendicularly to the longitudinal direction of the second raceway groove. In this case, since the roller collision receiving surface of the extending portion is formed in such a manner as to surround a roller, in the event of collision of a roller with the extending portion, the area of contact of the roller with the extending portion increases, whereby impact surface pressure between the extending portion and the roller can be reduced. In the case where the spacer having the extending portion is manufactured of a metal material in place of a resin material, wear of the extending portion resulting from collision of rollers can be further restrained.

DETAILED DESCRIPTION OF THE EMBODIMENT

The linear motion guide unit according to the present invention is applied to sliding sections of various types of apparatus having a relative sliding member, such as machine tools, semiconductor fabrication systems, and precision measuring apparatus, and can improve durability required recently of high-speed linear motion guide units.

Figure 1:
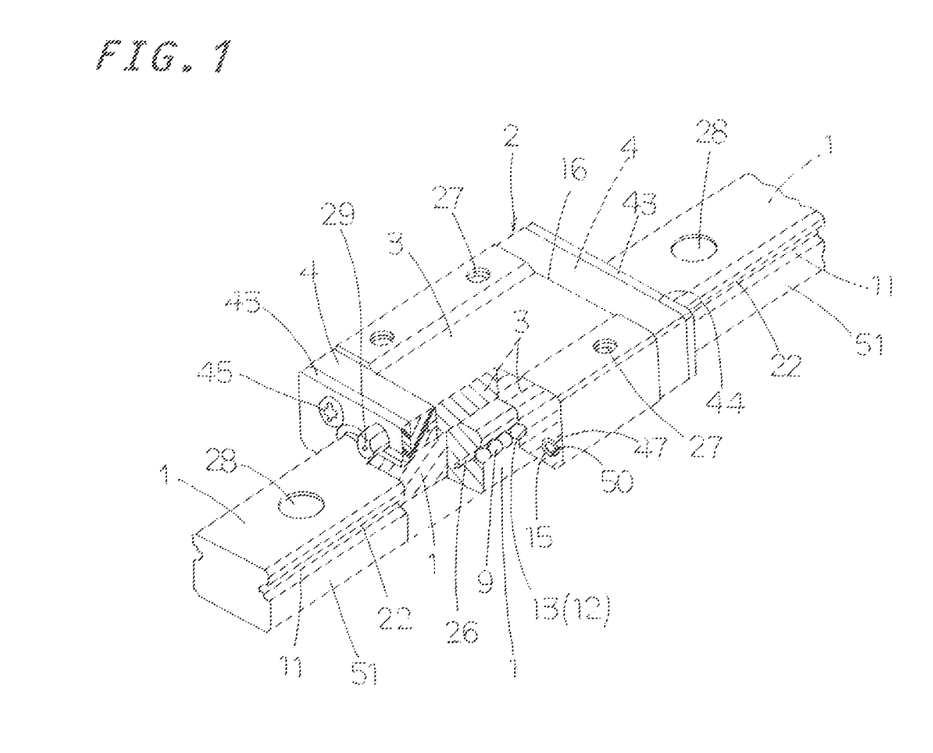
FIG. 1 is a partially sectional perspective view showing an embodiment of a linear motion guide unit according to the present invention.
Figure 2:
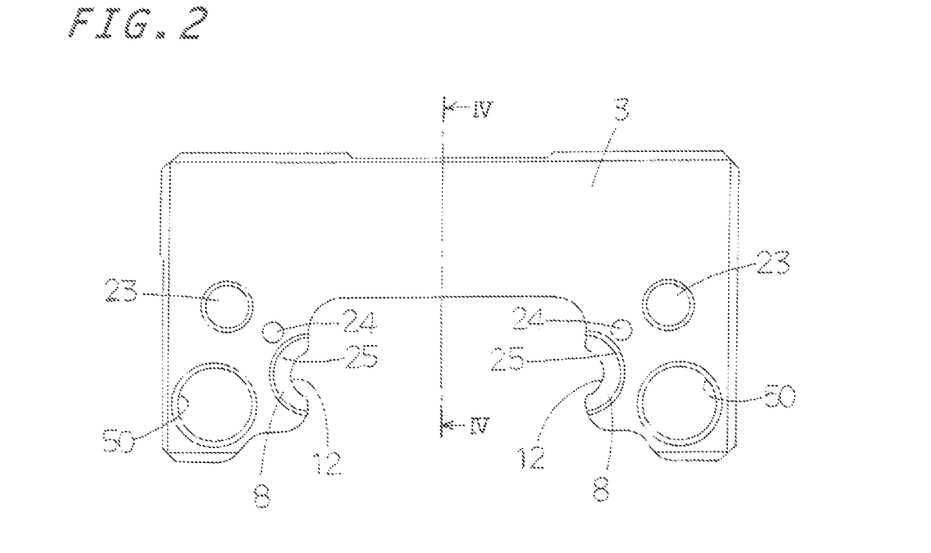
FIG. 2 is an end view showing a carriage of the linear motion guide unit of FIG. 1.
Figure 3:
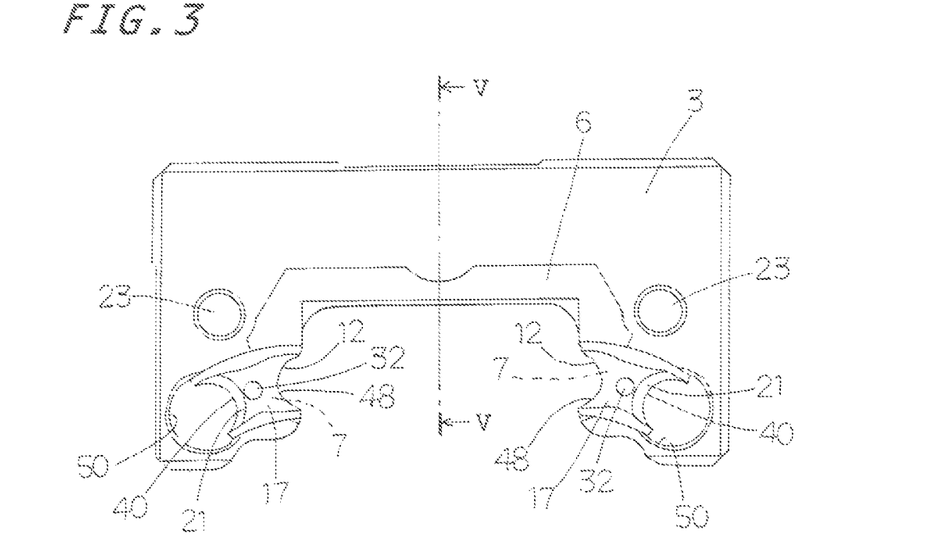
FIG. 3 is an end view showing a state in which a spacer of an end cap is disposed on the end surface of a carriage of FIG. 2.
Figure 4:
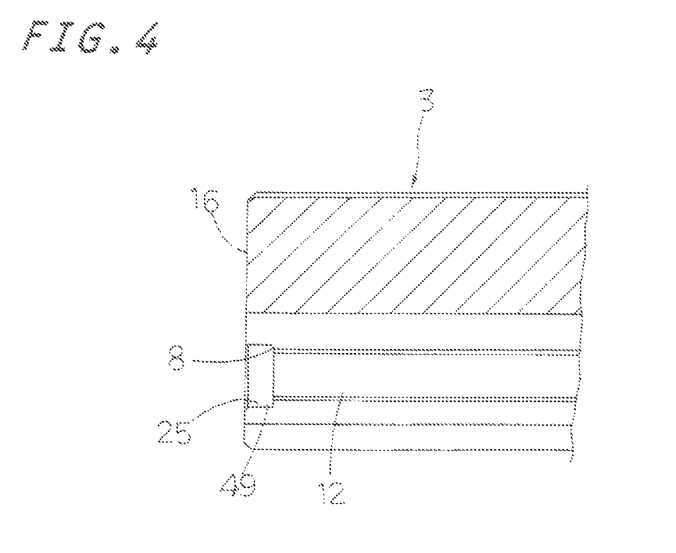
FIG. 4 is a sectional view of the carriage taken along line IV-IV of FIG. 2, showing a portion of the carriage.
Figure 5:
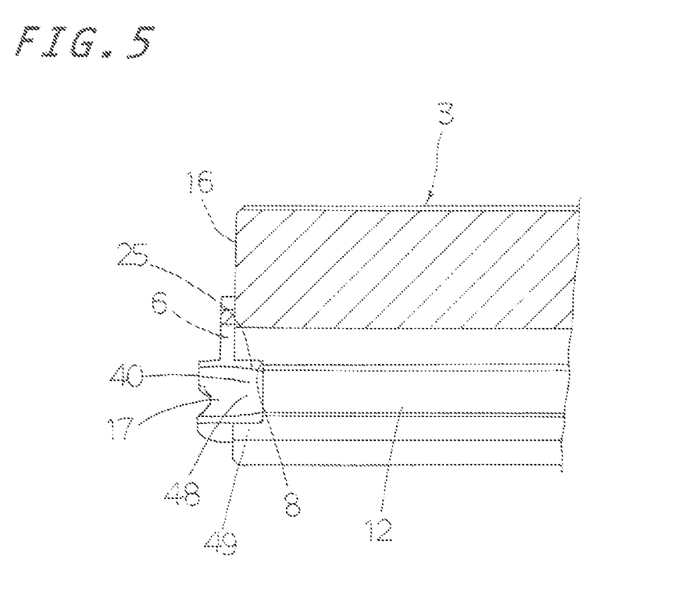
FIG. 5 is a sectional view of the carriage taken along line V-V of FIG. 3, showing a portion of the carriage and the spacer.
Figure 6:
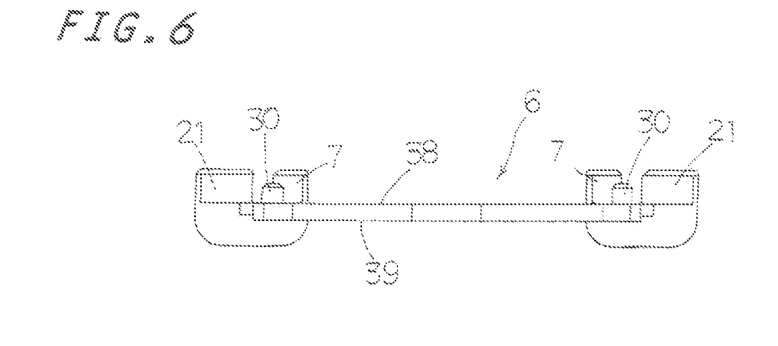
FIG. 6 is a plan view showing the spacer of the end cap in the linear motion guide unit of FIG. 1.
Figure 7:
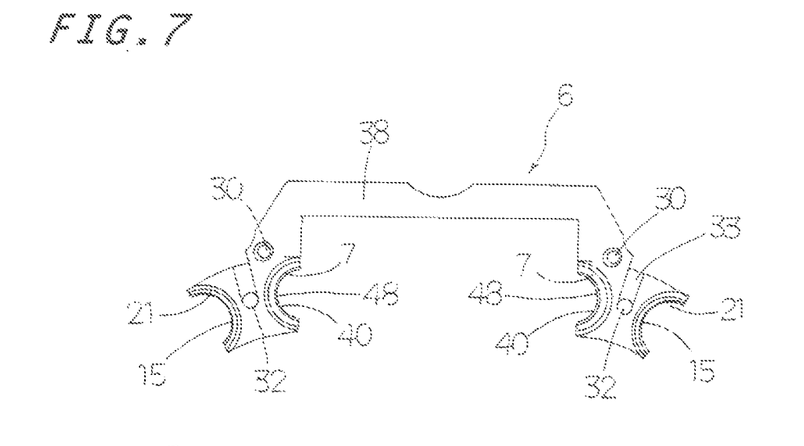
FIG. 7 is a rear view of the spacer of FIG. 6 as viewed from a carriage side.
Figure 8:
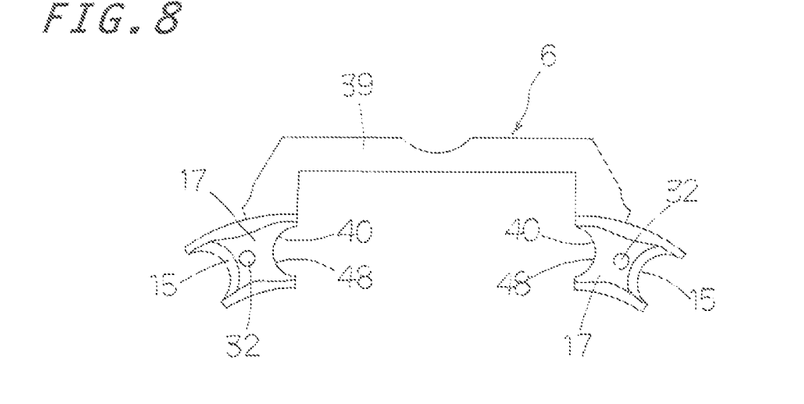
FIG. 8 is a front view of the spacer of FIG. 6.
Figure 9:
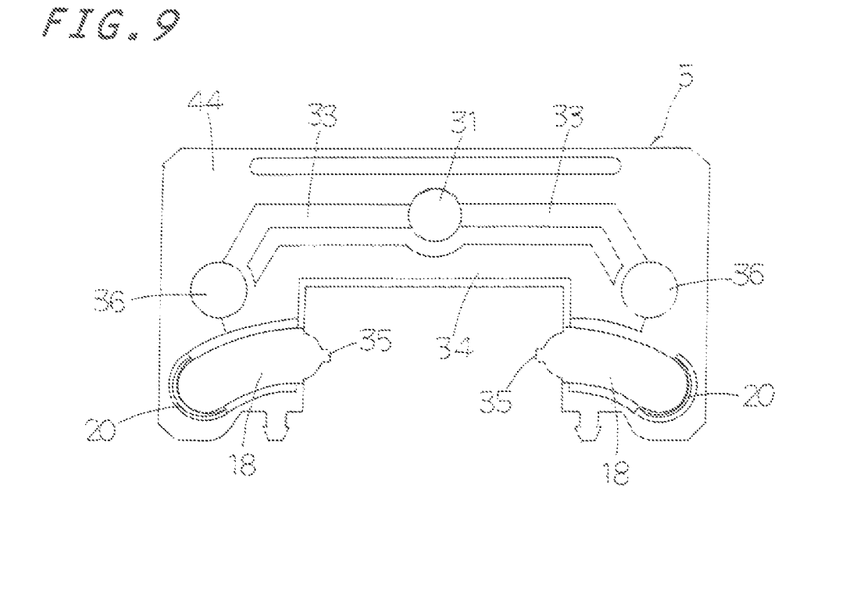
FIG. 9 is a rear view of an end cap body of the end cap in the linear motion guide unit of FIG. 1 as viewed from the carriage side.
Figure 10:
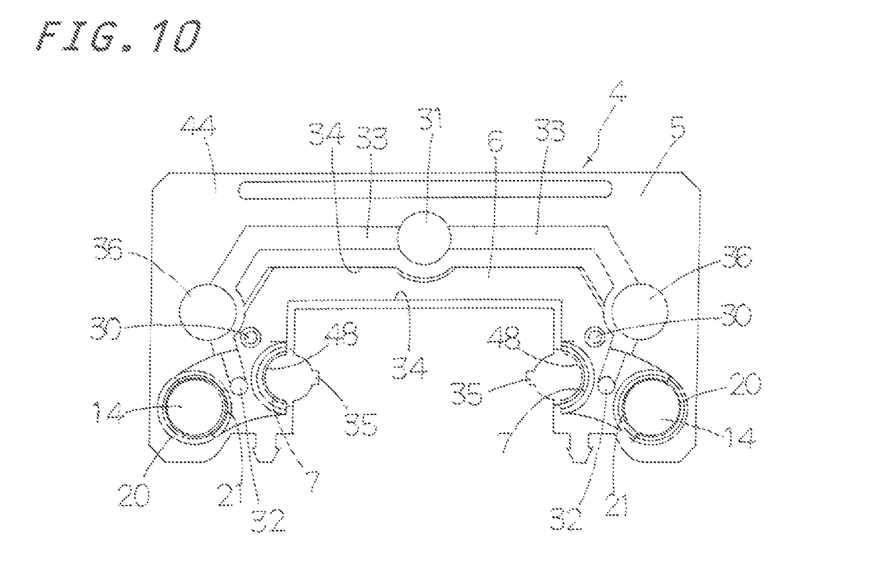
FIG. 10 is a rear view showing a state in which the spacer is disposed in a recess formed in the end cap body of FIG. 9.

An embodiment of a linear motion guide unit according to the present invention will next be described with reference to the drawings. The linear motion guide unit of the present invention has a guide rail 1 having raceway grooves 11 (first raceway grooves) formed thereon along a longitudinal direction, and a slider 2 having raceway grooves 12 (second raceway grooves) facing the raceway grooves 11 of the guide rail 1, and sliding in relation to the guide rail 1 via a plurality of rolling elements, or rollers 9. The slider 2 is composed of an upper portion and wing portions extending downward from the opposite sides of the upper portion in such a manner as to straddle the guide rail 1. The slider 2 generally includes a carriage 3 having the raceway grooves 12 and return passages 15 extending along the raceway grooves 12; end caps 4 disposed on respective opposite end surfaces 16 of the carriage 3 and each having arc turnaround passages 14 which establish communication between the return passages 15 and load-carrying races 13 each composed of the raceway groove 11 and the raceway groove 12; and end seals 43 disposed on respective end surfaces 44 of the end caps 4. In the present linear motion guide unit, each of the load-carrying races 13 is of a Gothic arch groove type in which each of rollers 9 is in four-point contact with the raceway groove 11 of the guide rail 1 and the raceway groove 12 of the carriage 3. In the present linear motion guide unit, the load-carrying race 13, the return passage 15, and a pair of the turnaround passages 14 constitute a circulation passage where the rollers 9 circulate infinitely. The carriage 3 has threaded holes 27 formed therein for mounting thereon a counter member, such as a workpiece or a device. The guide rail 1 has clearance grooves 22 formed longitudinally on respective longitudinal sides 51; the raceway grooves 11 are formed along the respective clearance grooves 22; and holding bands 26 extend through the respective clearance grooves 22 for holding the rollers 9 in the slider 2. The guide rail 1 has mounting holes 28 formed therein for attachment to a bed or a base of equipment, etc. In the present linear motion guide unit, grease nipples 29 are attached to the end surfaces of the end seals 43, respectively, for supplying lubricant. Fastening screws 45 inserted through mounting holes 36 of the end caps 4 and through mounting holes of the end seals 43 are threadingly engaged with threaded holes 23 of the carriage 3, whereby the end caps 4 and the end seals 43 are fixed to the carriage 3.

The end cap 4 is composed of an end cap body 5 which has scooping beaks 35 located on the raceway grooves 11 of the guide rail 1 and outer circumferential surfaces 18 of the turnaround passages 14, and a spacer 6 which is fitted into a recess 34 formed in the carriage-side end surface 44 of the end cap body 5 and has inner circumferential surfaces 17 of the turnaround passages 14. The spacer 6 is disposed in and positioned by the recess 34 formed in the end cap body 5. Since the spacer 6 is disposed on and positioned in relation to the carriage 3, the spacer 6 has positioning projections 30 to be fitted into positioning holes 24 formed in the carriage 3. The end cap body 5 of the end cap 4 has a lubrication hole 31 into which the grease nipple 29 used to supply lubricant is fitted, and a lubrication groove 33 extending from the lubrication hole 31 to the turnaround passages 14. The spacer 6 has lubrication holes 32 communicating with the lubrication groove 33 and formed respectively in the inner circumferential surfaces 17 of the turnaround passages 14 for supply of lubricant. The spacer 6 has extending portions 7, connection pipe portions 21, and the positioning projections 30, which protrude from an end surface 38 of the spacer 6 on the carriage 3 side. The spacer 6 also has wall portions which form the inner circumferential surfaces 17 of the turnaround passages 14 and which protrude from an end surface 39 of the spacer 6 on the end cap body 5 side so as to be fitted into the recess 34 formed in an outer circumferential surface 18 of the end cap body 5. Scooping beaks 35 formed on the end cap body 5 are positioned respectively in the raceway grooves 11 of the guide rail 1. In the linear motion guide unit, the rollers 9, or rolling elements, move in a reciprocating manner with the positions of tips 37 of the scooping beaks 35 serving as boundaries between the load-carrying races 13 and the turnaround passages 14.

In the present linear motion guide unit, particularly, in each end cap 4, the spacer 6 has the extending portions 7 which protrude from the spacer 6 at a position adjacent to the inner circumferential surfaces 17 of the turnaround passages 14 and which have respective wall surfaces extending continuously from the inner circumferential surfaces 17 of the turnaround passages 14 and serving as collision receiving surfaces 40 for the rollers 9. The carriage 3 has a groove-like housing recess 25 which is formed by a stepwise space 8 at an end 49 of each raceway groove 12 thereof and to which the extending portion 7 is fitted. A semicircular wall surface 48 of each extending portion 7 and an end raceway surface of each raceway groove 12 of the carriage 3 are connected in such a manner as to form a continuous surface. The semicircular wall surface 48 of the extending portion 7 corresponds to the raceway groove 12 of the carriage 3. An end portion of the extending portion 7 is radiused so as to be compatible with the shape of the housing recess 25. The stepwise space 8 of the carriage 3 is radiused at its bottom in contact with the end surface of the extending portion 7, thereby forming an R-shape 46. By imparting the R-shape 46 to the stepwise spaces 8 of the carriage 3, there can be restrained the occurrence of quenching crack in the course of quenching the raceway grooves 12 of the carriage 3. The collision receiving surface 40 of the extending portion 7 of the spacer 6 is formed into the semicircular wall surface 48 corresponding in shape to the raceway groove 12 of the carriage 3. Since the spacer 6 having the extending portions 7 is formed of a resin material having wear resistance, such as PEEK (polyetheretherketone) or POM (polyacetal resin), and being inexpensive as compared with the material of the carriage 3, the spacer 6 having the extending portions 7 can be manufactured easily at low cost; further, in the event of damage to the extending portion(s) 7, only the spacer 6 can be replaced with a new one. In the case where the spacer 6 having the extending portions 7 is manufactured of a metal material in place of a resin material, the extending portions 7 can be improved in wear resistance with respect to collision of the rollers 9; further, similar to the case of use of a resin material, in the event of damage to the extending portion(s) 7, only the spacer 6 may be replaced with a new one.

Figure 11:
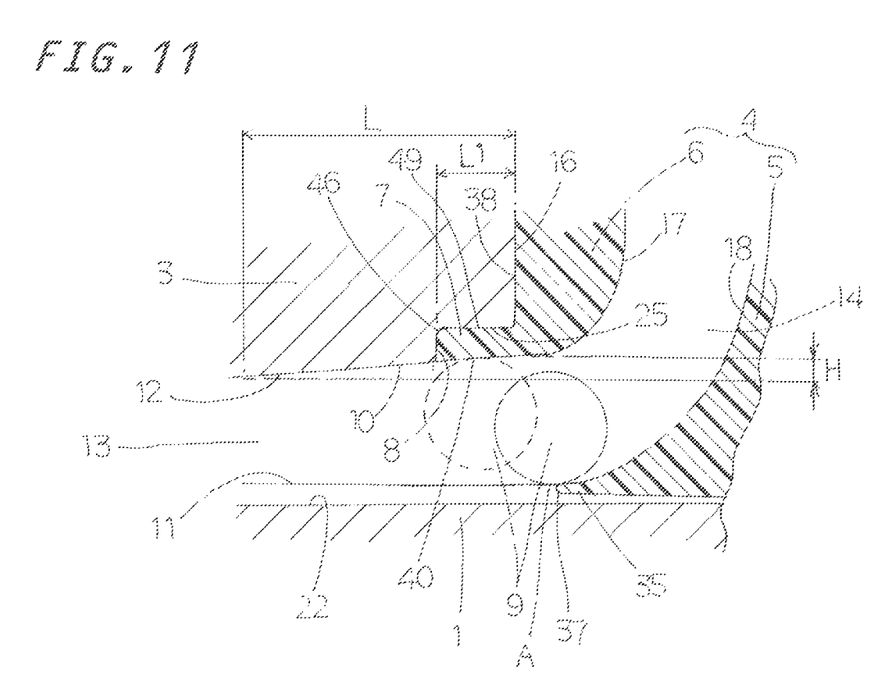
FIG. 11 is a conceptual view showing a state of communication in the linear motion guide unit between a turnaround passage and a load-carrying race composed of a raceway groove of a guide rail and a raceway groove of the carriage.

Next, with reference to FIG. 11, there will be described the state of rolling of the rollers 9 in the load-carrying race 13 and the turnaround passage 14 which constitute a circulation passage in the present linear motion guide unit. The present linear motion guide unit is of a retainer-less type not having a separator and a guide member. When the rollers 9, or rolling elements, roll in the load-carrying race 13 and the turnaround passage 14, the rollers 9 move in a reciprocating manner at the position of the tip 37 of the scooping beak 35 of the end cap body 5. In such a reciprocating move, the rollers 9 roll in the turnaround passage 14 while receiving centrifugal force, whereby the rollers 9 push against one another due to reception of centrifugal force. At that time or when each roller 9 passes the tip 37 of the scooping beak 35, the roller collides with the wall surface of the raceway groove 11 of the guide rail 1 at point A, bounds from the wall surface, and collides with the wall surface of the raceway groove 12 on the carriage 3 side as shown by the roller 9 in a dotted line. In the linear motion guide unit, since the extending portion 7 is disposed at the end 49 of the raceway groove 12 of the carriage 3, the extending portion 7 absorbs impact force imposed as a result of the roller 9 colliding with the collision receiving surface 40 thereof. In a conventional linear motion guide unit of a retainer-less type not having a separator and a guide member, as a result of the bounding roller 9 colliding with an end portion of the carriage, the end portion has potentially been susceptible to damage. By contrast, in the present linear motion guide unit, the bounding roller 9 collides with the extending portion 7 of the spacer 6; as a result, the extending portion 7 absorbs impact imposed by the colliding roller 9, thereby restraining damage to the end portion of the carriage 3. Further, the collision receiving surface 40 of the extending portion 7 of the spacer 6 is formed as the wall surface 48 which has a semicircular cross section, taken perpendicularly to the extending direction of the extending portion 7, so as to surround the roller 9. Therefore, when the roller 9 collides with the extending portion 7, the area of contact of the roller 9 with the extending portion 7 is large, whereby impact surface pressure between the extending portion 7 and the roller 9 can be reduced, and thus impact force can be more mitigated and absorbed.

Figure 12:
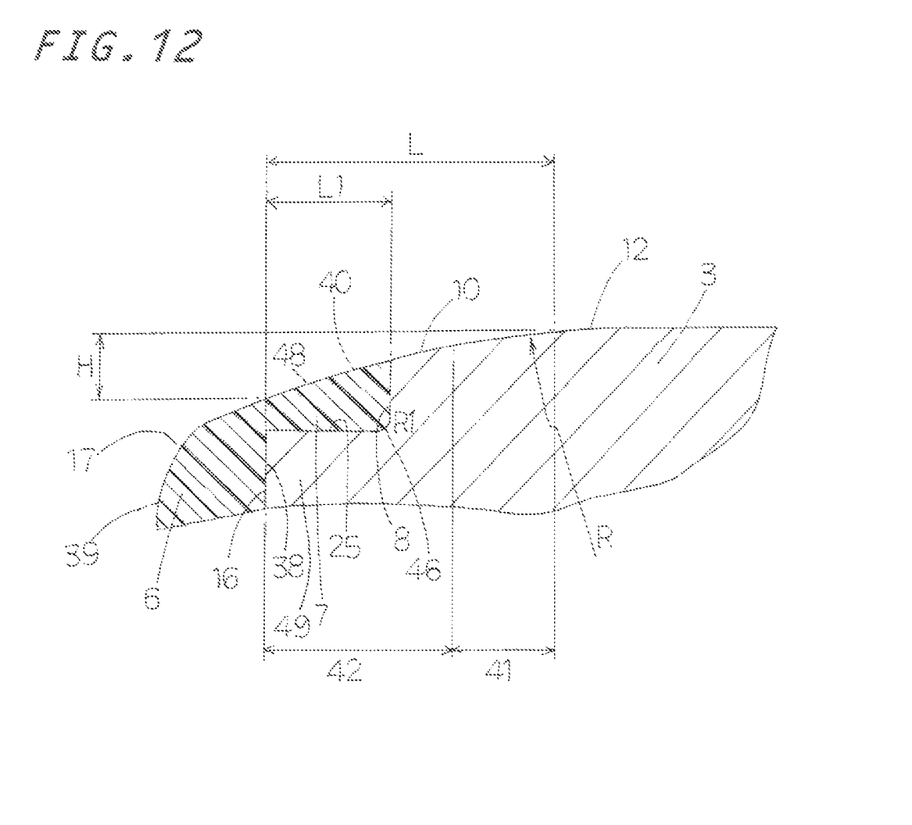
FIG. 12 is a sectional view taken along the direction of angle of contact, showing a state in which the spacer is disposed at an end portion of the carriage in the linear motion guide unit.

Also, in the present linear motion guide unit, a crowning portion 10 in the form of a curved surface gently curved toward the turnaround passage 14 is formed on an end raceway surface of the raceway groove 12 of the carriage 3 for allowing the rollers 9 to smoothly enter and exit from the load-carrying race 13. The housing recess 25 formed by the stepwise space 8 at the end 49 of the raceway groove 12 is located at the crowning portion 10. In order to enhance the travelling accuracy of the slider 2, for example, the raceway groove 12 and the crowning portion 10 are simultaneously ground by creep feed grinding such that the surface of the raceway groove 12 and the surface of the crowning portion 10 are smoothly connected into a single curved surface without formation of any corner or step. As shown in FIGS. 11 and 12, with the crowning length of the crowning portion 10 taken as L, the length L1 of the extending portion 7 is smaller than L. The crowning portion 10 formed in the carriage 3 can be designed to have a crowning length L corresponding to two times a roller diameter Da, for example. A length corresponding to two times the roller diameter Da means a length which falls within the range "1.5 times the roller diameter Da<L<2.5 times the roller diameter Da." At this time, the depth of the crowning portion 10 is represented by letter H. The depth H of the crowning portion 10 can be determined, for example, such that upon imposition of half of the basic static rated load of the linear motion guide unit, the amount of elastic deformation between the raceway grooves 11 and 12 and the rollers 9 in the raceway grooves 11 and 12 is equivalent to the amount of elastic deformation of the raceway grooves 11 and 12 along the direction of angle of contact. As shown in FIG. 12, as viewed in the section taken along the direction of angle of contact with the roller 9, the curved surface of the crowning portion 10 can have a single radius of curvature R. For example, in the case of a roller diameter Da of 3.175 mm, the crowning portion 10 can be designed to have a length L of 6.35 mm, a depth H of 0.0164 mm, and a radius of curvature R of 1.229 mm. The total of the crowning lengths L of the crowning portions 10 at the opposite ends of the raceway groove 12 can be set to, for example, 20% to 40% of the overall length of the carriage 3. As shown in FIG. 12, the extending portion 7 is located in a no-load area 42 of the crowning portion 10 and does not extend into a load area 41 of the crowning portion 10. In other words, the stepwise space 8 at an end of the carriage 3 is located in the no-load area 42 of the crowning portion 10; thus, the housing recess 25 of the carriage 3 is formed in the no-load area 42. In the present linear motion guide unit, since the spacer 6 can be disposed on the end surface 16 of the carriage 3 while being positioned through fitting of the positioning projections 30 of the spacer 6 into the positioning holes 24 of the carriage 3, with the spacer 6 disposed on the end surface 16 of the carriage 3, the raceway groove 12 of the carriage 3 and the semicircular wall surface 48 of the extending portion 7 of the spacer 6 can be simultaneously ground, whereby the surface of the raceway groove 12 and the semicircular wall surface 48 can be easily machined into a continuous surface.

The raceway groove 12 of the carriage 3 and the extending portion 7 of the spacer 6 disposed in the raceway groove 12 of the carriage 3 are simultaneously ground such that the surface of the raceway groove 12 and the semicircular wall surface 48 of the extending portion 7 are formed into the same surface. The extending portion 7 is curvilinearly formed such that the raceway surface of the raceway groove 12 merges into the inner circumferential surface 17 of the turnaround passage 14. In each of the end caps 4 of the present linear motion guide unit, semicircular connection pipe portions 20 formed in the end cap body 5 and semicircular connection pipe portions 21 formed in the spacer 6 are mated with each other to thereby form circular connection pipes for allowing smooth circulation of the rollers 9, and the connection pipes are fitted into respective insertion holes 50 formed in the carriage 3 to thereby form the turnaround passages 14 having smooth surfaces for allowing smooth rolling of the rollers 9. Sleeves 47 formed of sintered resin and impregnated with lubricant are inserted into the insertion holes 50 formed in the carriage 3 and form the return passages 15. In the present linear motion guide unit, the length L1 of the extending portion 7 of the spacer 6 is equal to the length of the connection pipe portion 21, which is a half segment of the connection pipe to be fitted into the end of the return passage 15 of the carriage 3 and protrudes from the back of the spacer 6. For example, the length L1 of the extending portion 7 is 0.63 times the roller diameter Da. Thus, since the extending portion 7 of the spacer 6 protrudes by the same amount as does the connection pipe portion 21 and can be machined simultaneously with the connection pipe portion 21, the extending portions 7 of the spacer 6 can be easily machined.

What is claimed is:

1. A linear motion guide unit comprising:
a guide rail having a first raceway groove extending along a longitudinal direction, and
a slider which has a second raceway groove facing the first raceway groove of the guide rail and slides in relation to the guide rail via a plurality of rolling elements,
the slider having a carriage in which the raceway groove and a return passage extending along the second raceway groove are formed, and end caps which are disposed on opposite end surfaces of the carriage and in which arc turnaround passages are formed respectively and establish communication between the return passage and a load-carrying race composed of the first raceway groove and the second raceway groove, to thereby form a circulation passage for the rolling elements,
wherein each end cap has an extending portion which protrudes from the end cap at a position adjacent to an inner circumferential surface of the turnaround passage and which has a wall surface extending continuously from the inner circumferential surface of the turnaround passage and serving as a collision receiving surface for receiving collision of the rolling elements;
wherein the carriage has, at each of opposite ends of the second raceway groove, a housing recess which is formed by a stepwise space and to which the extending portion is fitted;
wherein the wall surface of the extending portion and an end raceway surface of the second raceway groove form a continuous surface; and
wherein a crowning portion in the form of a curved surface gently curved toward the turnaround passage is formed on the end raceway surface of the second raceway groove of the carriage for allowing the rolling elements to smoothly enter and exit from the load-carrying race, and the stepwise space formed at the end of the second raceway groove is located at a position corresponding to the crowning portion.

2. The linear motion guide unit according to claim 1, wherein the end cap comprises: an end cap body having a scooping beak located on the first raceway groove of the guide rail, and having an outer circumferential surface of the turnaround passage formed thereon, and a spacer fitted in a recess formed in a carriage-side end surface of the end cap body, having the inner circumferential surface of the turnaround passage formed thereon, and having the extending portion.

3. The linear motion guide unit according to claim 2, wherein a positioning hole is formed in each of the opposite ends of the carriage for positioning the spacer in relation to the carriage, and the spacer has a positioning projection to be fitted into the positioning hole.

4. The linear motion guide unit according to claim 1, wherein the wall surface of the extending portion is semicircularly curved from the end raceway surface of the second raceway groove to the inner circumferential surface of the turnaround passage.

5. The linear motion guide unit according to claim 1, wherein the rolling element is a roller, and a length of the extending portion is equal to a length of a connection pipe which protrudes from a back of the end cap and which is to be fitted into an end of the return passage of the carriage.

6. A linear motion guide unit according to comprising:
a guide rail having a first raceway groove extending along a longitudinal direction, and
a slider which has a second raceway groove facing the first raceway groove of the guide rail and slides in relation to the guide rail via a plurality of rolling elements,
the slider having a carriage in which the raceway groove and a return passage extending along the second raceway groove are formed, and end caps which are disposed on opposite end surfaces of the carriage and in which arc turnaround passages are formed respectively and establish communication between the return passage and a load-carrying race composed of the first raceway groove and the second raceway groove, to thereby form a circulation passage for the rolling elements,
wherein each end cap has an extending portion which protrudes from the end cap at a position adjacent to an inner circumferential surface of the turnaround passage and which has a wall surface extending continuously from the inner circumferential surface of the turnaround passage and serving as a collision receiving surface for receiving collision of the rolling elements;
wherein the carriage has, at each of opposite ends of the second raceway groove, a housing recess which is formed by a stepwise space and to which the extending portion is fitted;
wherein the wall surface of the extending portion and an end raceway surface of the second raceway groove form a continuous surface;
wherein the end cap comprises: an end cap body having a scooping beak located on the first raceway groove of the guide rail, and having an outer circumferential surface of the turnaround passage formed thereon, and a spacer fitted in a recess formed in a carriage-side end surface of the end cap body, having the inner circumferential surface of the turnaround passage formed thereon, and having the extending portion; and
wherein the second raceway groove of the carriage and the extending portion of the spacer disposed on the second raceway groove undergo simultaneous grinding such that a surface of the second raceway groove and the wall surface of the extending portion are formed into the continuous surface.

7. A linear motion guide unit comprising:
a guide rail having a first raceway groove extending along a longitudinal direction, and a slider which has a second raceway groove facing the first raceway groove of the guide rail and slides in relation to the guide rail via a plurality of rolling elements, the slider having a carriage in which the raceway groove and a return passage extending along the second raceway groove are formed, and end caps which are disposed on opposite end surfaces of the carriage and in which arc turnaround passages are formed respectively and establish communication between the return passage and a load-carrying race composed of the first raceway groove and the second raceway groove, to thereby form a circulation passage for the rolling elements, wherein each end cap has an extending portion which protrudes from the end cap at a position adjacent to an inner circumferential surface of the turnaround passage and which has a wall surface extending continuously from the inner circumferential surface of the turnaround passage and serving as a collision receiving surface for receiving collision of the rolling elements;

wherein the carriage has, at each of opposite ends of the second raceway groove, a housing recess which is formed by a stepwise space and to which the extending portion is fitted;

wherein the wall surface of the extending portion and an end raceway surface of the second raceway groove form a continuous surface; and wherein the stepwise space of the carriage is radiused at a corner of its bottom in contact with an end surface of the extending portion.

\* \* \* \* \*